(12) United States Patent
Yang (10) Patent No.: US 9,083,847 B2
(45) Date of Patent: Jul. 14, 2015

(54) VIDEO COMMUNICATION METHOD AND TERMINAL

(75) Inventor: Hui Yang, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 105 days.

(21) Appl. No.: 13/978,264

(22) PCT Filed: Mar. 4, 2011

(86) PCT No.: PCT/CN2011/071544
§ 371 (c)(1),
(2), (4) Date: Jul. 3, 2013

(87) PCT Pub. No.: WO2012/097531
PCT Pub. Date: Jul. 26, 2012

(65) Prior Publication Data
US 2013/0278707 A1    Oct. 24, 2013

(30) Foreign Application Priority Data
Jan. 18, 2011  (CN) .......................... 2011 1 0020132

(51) Int. Cl.
| H04N 7/14 | (2006.01) |
| H04L 29/06 | (2006.01) |
| H04W 4/00 | (2009.01) |
| H04W 84/18 | (2009.01) |

(52) U.S. Cl.
CPC ............ *H04N 7/148* (2013.01); *H04L 65/1069* (2013.01); *H04W 4/008* (2013.01); *H04W 84/18* (2013.01)

(58) Field of Classification Search
CPC ....... H02J 7/025; H04B 5/0037; H01F 38/14; H04N 7/148
USPC .............. 235/462.13, 435; 348/14.02, 14.08; 351/158; 370/328; 375/240.16; 455/41.2, 566; 706/48; 709/203
See application file for complete search history.

(56) References Cited

U.S. PATENT DOCUMENTS

| 7,194,238 B2* | 3/2007 | Virtanen ...................... 455/41.2 |
| 7,758,185 B2* | 7/2010 | Lewis .......................... 351/158 |
| 7,792,777 B2* | 9/2010 | Selin ............................. 706/48 |
| 8,342,407 B2* | 1/2013 | Williams et al. .......... 235/462.13 |

(Continued)

FOREIGN PATENT DOCUMENTS

| CN | 1388697 A | 1/2003 |
| CN | 1441602 A | 9/2003 |
| CN | 101651816 A | 2/2010 |

*Primary Examiner* — Gerald Gauthier
(74) *Attorney, Agent, or Firm* — Ladas & Parry LLP (57) ABSTRACT

The disclosure provides a method for realizing visual communication and a terminal. The method includes: the initiating terminal and the receiving terminal of the visual communication establish a Bluetooth wireless communication link between the initiating terminal and the receiving terminal via the respective Bluetooth module thereof; and the initiating terminal and the receiving terminal transmit the multimedia information via the established Bluetooth wireless communication link to carry out the visual communication. In the disclosure, the Bluetooth technology and the low rate audio/video coding technology are combined effectively with the feature that the connection and networking are flexible and diversified and the capability of transmitting via a low bandwidth channel.

17 Claims, 4 Drawing Sheets

(56) References Cited

U.S. PATENT DOCUMENTS

| | | |
|---|---|---|
| 8,706,170 B2* | 4/2014 | Jacobsen et al. ............... 455/566 |
| 8,761,258 B2* | 6/2014 | Au et al. .................. 375/240.16 |
| 2002/0020743 A1* | 2/2002 | Sugukawa et al. ............ 235/435 |
| 2004/0203382 A1* | 10/2004 | Park ............................. 455/41.2 |
| 2007/0121540 A1* | 5/2007 | Sharp et al. .................... 370/328 |
| 2008/0024593 A1* | 1/2008 | Tsirinsky et al. .......... 348/14.08 |
| 2009/0172083 A9* | 7/2009 | Fillebrown et al. ........... 709/203 |
| 2013/0278707 A1* | 10/2013 | Yang, Hui .................. 348/14.02 |

* cited by examiner

VIDEO COMMUNICATION METHOD AND TERMINAL

RELATED APPLICATION INFORMATION

This application is a 371 of International Application PCT/CN2011/071544 filed 4 Mar. 2011 entitled "Video Communication Method and Terminal", which was published on 26 Jul. 2012, with International Publication Number WO 2012/097531 A1, and which claims priority from CN Application No. 201110020132.7 filed 18 Jan. 2011, the contents of which are incorporated herein by reference.

FIELD OF THE INVENTION

The disclosure relates to the communication field, and particularly to a method for realizing visual communication and a terminal.

BACKGROUND OF THE INVENTION

The videophone service is a multimedia communication service integrated with image and voice and can realize face-to-face and real time communication between people, i.e. the communication peer can view the scene of each other during communication. The description of this service can be made reference to 3GPP TS, H.324, H.245, and H.223.

The Bluetooth technology is commonly created by a Special Interest Group (abbreviated as SIG) consisting of the Ericsson company and companies such as Intel, IBM, Nokia, Toshiba, etc. From the Bluetooth 1.0 version issued in 1999 to the current Bluetooth 3.0 version, the Bluetooth technology has gone through flourishing development. Due to its unique and good features, the Bluetooth technology is prevailing in the world.

The current videophone service has to be realized by the common telephone network, and needs the support of the operator during the implementation, which will inevitably affect the application range of the videophone service.

SUMMARY OF THE INVENTION

The main object of the disclosure is to provide a method for realizing visual communication and a terminal, so as to solve at least the above problems.

A method for realizing visual communication is provided according to one aspect of the disclosure, comprising: the initiating terminal and the receiving terminal of the visual communication establishing a Bluetooth wireless communication link between the initiating terminal and the receiving terminal via the respective Bluetooth module thereof; and the initiating terminal and the receiving terminal transmit multimedia information via an established Bluetooth wireless communication link to carry out visual communication.

Preferably, before the initiating terminal and the receiving terminal transmit multimedia information via the established Bluetooth wireless communication link, the method further comprises: the initiating terminal and the receiving terminal transmit control information to each other so as to indicate the an opposite end to adjust the transceiving power of the Bluetooth module thereof to a preset target value; and the initiating terminal and the receiving terminal transmitting multimedia information via the established Bluetooth wireless communication link comprises: the initiating terminal and the receiving terminal takes the preset target value indicated by the received control information as the current transceiving power of the Bluetooth module and transmit the multimedia information via the established Bluetooth wireless communication link.

Preferably, the initiating terminal and the receiving terminal transmitting control information to each other so as to indicate the opposite end to adjust the transceiving power of the Bluetooth module thereof to the preset target value comprises: the initiating terminal sends a first control information to the receiving terminal to indicate the receiving terminal to adjust the transceiving power of the Bluetooth module of the receiving terminal to the preset target value indicated by the first control information; and when completing adjusting the transceiving power of the Bluetooth module of the receiving terminal to the preset target value indicated by the first control information, the receiving terminal sends a second control information to the initiating terminal to indicate the initiating terminal to adjust the transceiving power of the Bluetooth module of the initiating terminal to the preset target value indicated by the second control information.

Preferably, the preset target value indicated by the control information is the maximum transceiving power of the Bluetooth module of a terminal which receives the control information.

Preferably, the control information is sent by a link management protocol (LMP) entity of the Bluetooth module by an LMP protocol data unit (PDU).

Preferably, the initiating terminal and the receiving terminal of the visual communication establishing a Bluetooth wireless communication link between the initiating terminal and the receiving terminal via the respective Bluetooth module thereof comprises: a video call control (VCC) entity in the Bluetooth module of the initiating terminal receives an instruction sent by an application of the initiating terminal for establishing the Bluetooth wireless communication link via an interface; the VCC entity controls a baseband layer to start up a process of query, paging, query scanning and paging scanning via an interface; and the VCC entity controls the LMP entity to establish and issue the Bluetooth wireless communication link with the receiving terminal via an interface.

Preferably, the initiating terminal and the receiving terminal transmitting the multimedia information via the established Bluetooth wireless communication link to carry out visual communication comprises: the VCC entity controls the connection of an internal visual path using a voice and video synchronization control interface, wherein the application on the established Bluetooth wireless communication link, the application transmits the multimedia information with an application of the receiving terminal via the internal visual path so as to carry out the visual communication.

Preferably, before the initiating terminal and the receiving terminal transmitting the multimedia information via the established Bluetooth wireless communication link to carry out the visual communication, the method further comprises: the VCC entity feeds back a message that the Bluetooth wireless communication link is established successfully to the application of the initiating terminal; and the application of the initiating terminal and the application of the receiving terminal carry out peer layer multiplexing information interaction and a logical channel communication using an H.324 signaling.

Preferably, after carrying out the visual communication, the method further comprises: the initiating terminal or the receiving terminal initiates a visual communication end command to the opposite end; removing the logical channel between the initiating terminal and the receiving terminal;

and removing the Bluetooth wireless communication link between the initiating terminal and the receiving terminal.

Preferably, the Bluetooth wireless communication link is a synchronous connection-oriented (SCO) link.

A terminal is provided according to another aspect of the disclosure, comprising: a Bluetooth module, configured to interact with a Bluetooth module of an opposite end and establish a Bluetooth wireless communication link between the terminal and the opposite end; and a visual communication module, configured to transmit multimedia information via an established Bluetooth wireless communication link with the opposite end to carry out visual communication.

Preferably, the terminal further comprises: a control transceiving module, configured to send to the opposite end a first control information indicating to adjust the transceiving power of the Bluetooth module of the opposite end to a preset target value and receive from the terminal a second control information indicating to adjust the transceiving power of the Bluetooth module of the terminal to the preset target value from the terminal; and the visual communication module being configured to take the preset target value indicated by the second control information as a current transceiving power of the Bluetooth module of the terminal, and transmit the multimedia information via the established Bluetooth wireless communication link to carry out the visual communication.

By way of the disclosure, the initiating terminal and the receiving terminal establish a Bluetooth wireless communication link by means of the Bluetooth module thereof and transmit the multimedia information of the visual communication via the established Bluetooth wireless communication link to carry out the visual communication, it solves the problem in the related art that the visual communication needs the support of the operators which affects the application range of the videophone service, and enable two Bluetooth mobile phone in the same network to directly carry out the visual communication without the common telephone network. And this method effectively combines the Bluetooth technology and the low rate audio/video coding technology together with the feature that the connection and networking are flexible and diversified and the capability of transmitting via a low bandwidth channel.

BRIEF DESCRIPTION OF THE DRAWINGS

The drawings illustrated here provide a further understanding of the disclosure and form a part of the present application. The exemplary embodiments and the description thereof are used to explain the disclosure without unduly limiting the scope of the disclosure. In the drawings.

DETAILED DESCRIPTION OF EMBODIMENTS

The disclosure will be described hereinafter in detail with reference to the accompanying drawings and in conjunction with embodiments. It should be noted that the embodiments of the present application and the features in the embodiments can be combined with each other if there is no conflict.

Figure 1:
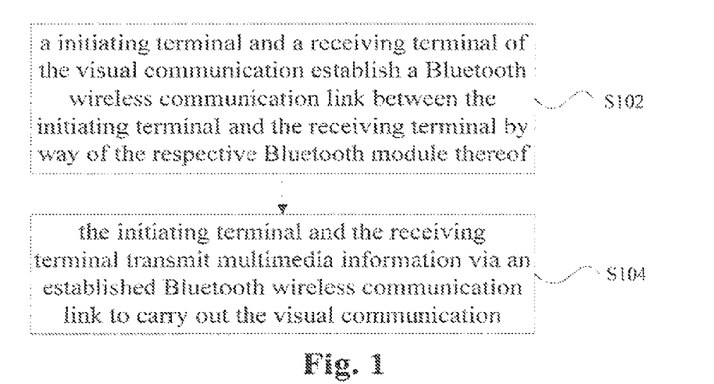
FIG. 1 is a flowchart of a method for realizing visual communication according to one embodiment of the disclosure.

FIG. 1 is a flowchart of a method for realizing visual communication according to one embodiments of the disclosure, and the method comprises:

Step S102, a initiating terminal and a receiving terminal of the visual communication establish a Bluetooth wireless communication link between the initiating terminal and the receiving terminal via the respective Bluetooth module thereof; and Step S104, the initiating terminal and the receiving terminal transmit multimedia information via an established Bluetooth wireless communication link to carry out the visual communication.

By way of the above method, the user can realize visual communication using Bluetooth without the common telephone network provided by the operator. In this method, the Bluetooth technology and the low rate audio/video coding technology are combined effectively with the feature that the connection and networking are flexible and diversified and the capability of transmitting via a low bandwidth channel. This technology is a further extension of the "three into one" application of Bluetooth. For example, in a building, it is an internal videophone which will charge no fee. Such free multimedia communication manner makes the communication more flexible and diversified.

The Bluetooth belongs to wireless transmission, and one of the features of the wireless channel is easy to attenuate, especially when encountering a barrier on the transmission path, for example, when being sheltered by objects such as wall, the attenuation is more obvious. In this case, the internal visual communication based on Bluetooth may be affected to a certain extent, phenomena such as asynchronous audio/video, blur video with mosaic, and even abnormal communication and so on may appear. For this end, the internal visual communication can be carried out normally by adding the transceiving power of the Bluetooth modules of the communication parties without adding hardware. In particular, before the initiating terminal and the receiving terminal transmit the multimedia information via the established Bluetooth wireless communication link, the initiating terminal and the receiving terminal can transmit the control information to each other so as to indicate the opposite end to adjust the transceiving power of the Bluetooth module thereof to a preset target value; and when the initiating terminal and the receiving terminal transmitting the multimedia information via the established Bluetooth wireless communication link, the initiating terminal and the receiving terminal respectively takes the preset target value indicated by the received control information as the current transceiving power of the Bluetooth module and transmit the multimedia information via the established Bluetooth wireless communication link.

During particular implementation, the initiating terminal and the receiving terminal transmitting the control information to each other so as to indicate the opposite end to adjust the transceiving power of the Bluetooth module thereof to the preset target value can be carried out according to the following order: the initiating terminal sends the first control information to the receiving terminal to indicate the receiving terminal to adjust the transceiving power of the Bluetooth module of the receiving terminal to the preset target value indicated by the first control information; and when completing adjusting the transceiving power of the Bluetooth module of the receiving terminal as the preset target value indicated by the first control information, the receiving terminal sends the second control information to the initiating terminal to indicate the initiating terminal to adjust the transceiving power of the Bluetooth module of the initiating terminal to the preset target value indicated by the second control information.

In this case, the preset target value indicated by the control information is the maximum transceiving power of the Bluetooth module of the terminal which receives the control information, and this manner can ensure the quality of the visual communication as much as possible without introducing complex judgment process.

According to the protocol specification of SIG, after the Bluetooth wireless communication link is established successfully, the link management protocol (abbreviated as LMP) entities of the Bluetooth modules of the communication parties can control the transceiving powers of the Bluetooth modules of the parties by interacting of the LMP PDU, that is to say, the above control information can be sent by the LMP entity of the Bluetooth module via the LMP protocol data unit (abbreviated as PDU). Based on the above specification, in the situation which the preset target value is the maximum transceiving power of the Bluetooth module, after the Bluetooth wireless communication link is established successfully, the initiator of the internal visual communication sends the corresponding PDU to the receiver to request to increase the power until the receiver reaches the maximum power; then, the receiver sends the corresponding PDU to the sender to request to increase the power until the sender reaches the maximum power. Afterwards, the visual communication PDU can be transmitted. During the internal visual communication, the powers of the initiator and receiver are kept under the maximum value so as to insure carrying out communication normally.

During particular implementation, the entire internal visual communication can be carried out by multiplexing the existing Internet protocol and the architecture thereof, for this end, a video call control (abbreviated as VCC) entity can be newly added to control the entire visual communication process, wherein:

the initiating terminal and the receiving terminal of the visual communication establishing a Bluetooth wireless communication link between the initiating terminal and the receiving terminal via the respective Bluetooth module thereof comprises: a video call control (VCC) entity in the Bluetooth module of the initiating terminal receives an instruction sent by an application of the initiating terminal for establishing the Bluetooth wireless communication link via an interface; the VCC entity controls the baseband layer to start up the process of query, paging, query scanning and paging scanning via an interface; and the VCC entity controls the LMP entity to establish and issue the Bluetooth wireless communication link with the receiving terminal via an interface.

The initiating terminal and the receiving terminal transmitting the multimedia information via the established Bluetooth wireless communication link to carry out the visual communication comprises: the VCC entity controls the connection of an internal visual path using a voice and video synchronization control interface, the application is on the established Bluetooth wireless communication link, the application transmits the multimedia information with an application of the receiving terminal via the internal visual path so as to carry out the visual communication.

Before the initiating terminal and the receiving terminal transmitting the multimedia information via the established Bluetooth wireless communication link to carry out the visual communication, the VCC entity feeds back a message that the Bluetooth wireless communication link is established successfully to the application of the initiating terminal; and the application of the initiating terminal and the application of the receiving terminal carry out peer layer multiplexing information interaction and the logical channel communication using an H.324 signaling. After carrying out the visual communication, one of the initiating terminal and the receiving terminal can initiate a visual communication end command to the peer, and when being ended, the logical channel between the initiating terminal and the receiving terminal can be first removed, and then the Bluetooth wireless communication link between the initiating terminal and the receiving terminal can be removed.

In the current specification, the Bluetooth supports 2 different kinds of links: synchronous connection-oriented (abbreviated as SCO) and asynchronous connection-less (abbreviated as ACL). Wherein, SCO is a synchronous connection-oriented link, and 2 devices carry out synchronous communication using the reserved bandwidth, which is similar to circuit switch. SCO grouping is mainly used for real-time service, and the information transmission rate reaches 64 kbit/s. Both the master device and slave device can establish up to 3 SCO links. ACL is a asynchronous connectionless-oriented link, and the master device can establish an ACL link based on each slot for any slave device in the non-SCO link reserved slot. The asymmetric connection positive rate of the ACL is 72.164 kbit/s, the negative response rate is 57.664 kbit/s, and the symmetric connection rate is 432.664 kbit/s.

The video signal transmitted in real-time has relatively high requirements on the selection of the link: 1, the transmission rate has to be ensured; and 2. there should be less delay. Although the transmission rate of the ACL manner is relative high, it may cause relatively large delay since it is similar to the features of packet transmission and the error retransmission mechanism. However, although the SCO manner only has a transmission rate of 64 kbit/s, it is enough for use regarding the multimedia information compressed by H.263. Moreover, the synchronization feature of the SCO manner more meets the transmission requirements of the real-time signal, therefore, the multimedia information can be transmitted in the manner of SCO.

Figure 2:
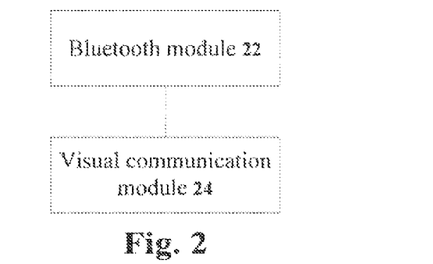
FIG. 2 is a structural block diagram of a terminal according to one embodiment of the disclosure.

FIG. 2 is a structural block diagram of a terminal according to one embodiments of the disclosure, and the terminal comprises: a Bluetooth module 22, is configured to interact with the Bluetooth module 22 of the opposite end and establish a Bluetooth wireless communication link between the terminal and the opposite end; and a visual communication module 24, is configured to transmit the multimedia information via the established Bluetooth wireless communication link with the opposite end to carry out the visual communication.

Figure 3:
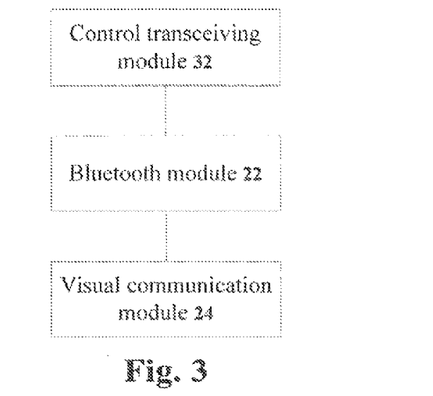
FIG. 3 is a preferred structural block diagram of a terminal according to one embodiment of the disclosure.

FIG. 3 is a preferred structural block diagram of a terminal according to one embodiments of the disclosure, and this terminal can further comprises: a control transceiving module 32, is configured to send to the opposite end a first control information indicating to adjust the transceiving power of the Bluetooth module 22 of the opposite end to a preset target value and receive a second control information indicating to adjust the transceiving power of the Bluetooth module 22 of the terminal to the preset target value from the terminal; and the visual communication module 24, is configured to take the preset target value indicated by the second control information as the current transceiving power of the Bluetooth module of the terminal and transmit the multimedia information via the established Bluetooth wireless communication link to carry out the visual communication.

Embodiments 1 to 3 described hereinafter are integrated with the technical solutions of a plurality of above preferred embodiments.

Embodiment 1

Figure 4:
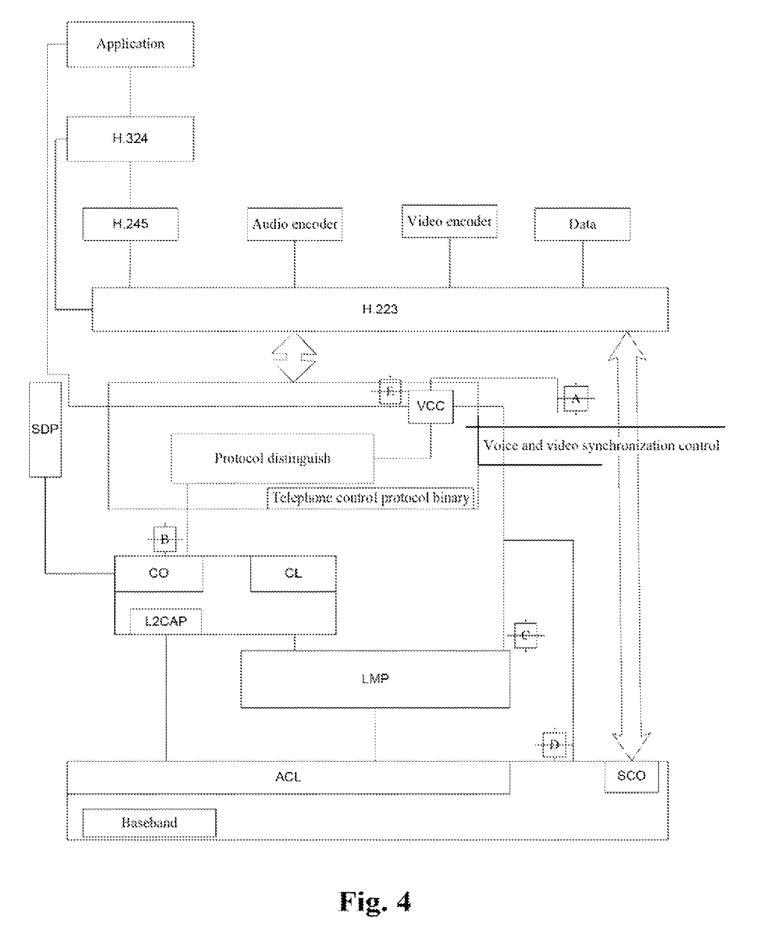
FIG. 4 is a protocol frame diagram of realizing internal visual communication based on Bluetooth according to embodiment 1.

FIG. 4 is a frame diagram of a protocol realizing internal visual communication based on Bluetooth according to embodiment 1. Detailed description is as follows:

H.223: H.223 is mainly responsible for the multiplexing and de-multiplexing of the video logical channel, voice logical channel, signaling logical channel, and data logical channel. It holds a channel multiplexing table and transmits the same to the opposite end. It multiplexes an audio/video control data stream into a single bit data stream and de-multiplexes the received single bit data stream into various multimedia streams. In addition, it executes logic frame, number order, error detection and error correction based on relay, which are suitable for every media type.

H.245: H.245 is used for controlling videophone signaling, which mainly completes capability information of exchange with the far end user, master and slave decision(s), video quality control, channel multiplexing table transfer, etc.

H.324: it controls and coordinates the H.223 and H.245 protocols and realizes the call initiated by the upper layer application.

Hereinafter, six interfaces identified in FIG. 4 will be described simply:

interface A, the video call control entity connects and disconnects the internal path using this voice and video synchronization control interface.

Interface B is used for transmitting the TCS information on the connection-oriented (point to point) L2CAP channel.

Interface C, the video call control entity directly controls a link manager to establish and issue an SCO link using this interface.

Interface D, the video call control entity controls the LC/baseband using this interface so as to directly start up the query, paging, query scanning and paging scanning process.

Interface E, the video call application notifies the video call control entity to establish a communication link using this interface.

The video call control (VCC) entity and the H.223 and H.245 as well as the H.324 protocols have a relationship of upper layer protocol and lower layer transmission entity. The function thereof is to establish a Bluetooth radio bearer for transmitting an H.324 protocol data packet, the H.324 protocol data packet includes video, audio, data and multimedia signaling. If the user wants to dial a Bluetooth based internal videophone, he has to first establish a Bluetooth radio link via the VCC, then can establish a multimedia signaling, and then can carry out video transmission after the multimedia signaling is interacted successfully. The particular interaction process is as follows:

1. the user dials the internal videophone, and this upper layer application sends an instruction to the VCC via the interface E to instruct the VCC to establish a Bluetooth link;

2. the VCC entity controls the baseband layer via the interface D to start up the process of query, paging, query scanning and paging scanning;

3. after the above processes are completed, the VCC directly controls the link manager to establish and issue an SCO link via the interface C, and after the establishment of the link is completed, the VCC feeds back a message that the link is established successfully to the upper layer application to indicate that the interaction of the multimedia control signaling can be carried out; and 4. as a result of the interaction of the multimedia control signaling, the VCC connects the internal visual path using the interface A, and after the internal visual communication is ended, the VCC disconnects the internal visual path using the interface A.

Embodiment 2

Figure 5:
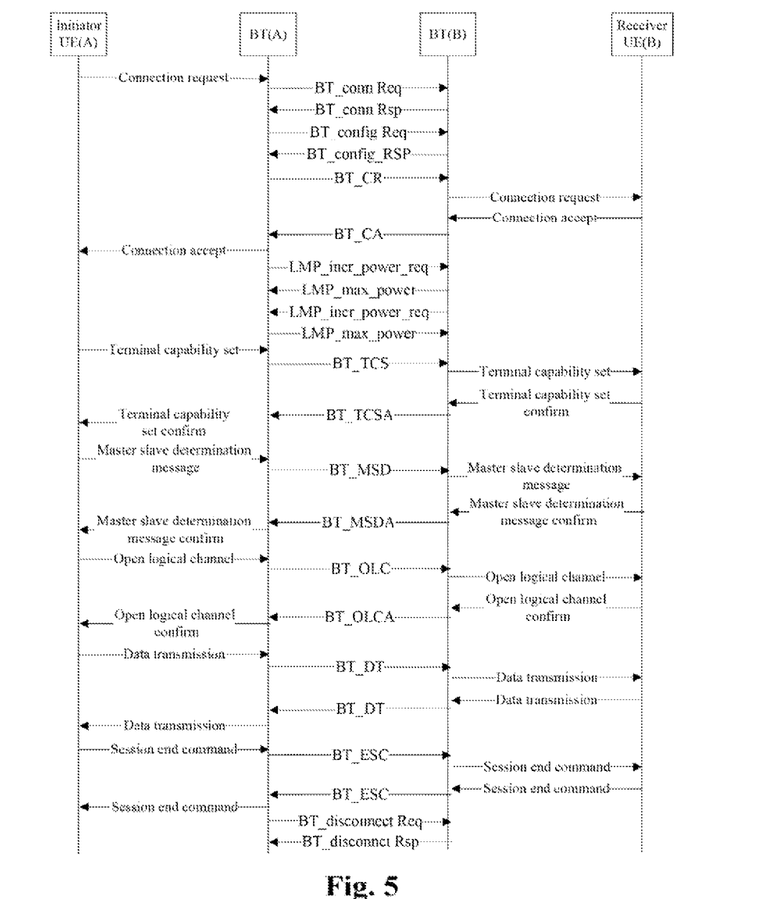
FIG. 5 is a flowchart of realizing internal visual communication based on Bluetooth according to embodiment 2.

During the process of realizing visual internal communication based on Bluetooth, a communication link is established by way of the signaling interaction between the Bluetooth wireless protocol stack communication entities shown in FIG. 4, after the communication link is established, the H.245 signaling is started to be executed: the exchange of the multiplexing level is carried out at the peer to peer and the logical channel is opened, so as to carry out the transmission of the multimedia information. FIG. 5 is a flowchart of realizing internal visual communication based on Bluetooth according to embodiment 2. Detailed description is as follows:

In step S502, the user A (marked as UE (A)) sends a connection request (abbreviated as Conn Req) command to the Bluetooth module (BT (A)) thereof to prepare to establish an internal visual communication link with the user B (marked as UE (B)).

In step S504, the Bluetooth modules interact signaling so as to establish a Bluetooth link and configure the same. If the Bluetooth link is established and configured successfully, the Bluetooth module A encapsulates the connection request PDU of the upper layer and sends the same to the Bluetooth module B (marked as BT (B)). The Bluetooth module B transfers the connection request PDU to the upper layer and transfers the connection accept PDU of the upper layer to the Bluetooth module A. The Bluetooth module A transfers the connection accept PDU to the upper layer, which identifies that the internal visual communication link is established successfully.

In step S506, after the Bluetooth wireless channel connection is established, the Bluetooth module A sends an LMP increase power request (LMP_incr_power_req) PDU to the Bluetooth module B to request the same to enhance the power, and this process continues until the LMP maximum power (LMP_max_power) PDU sent by the Bluetooth module B is received, which indicates that the maximum power is already in using, and the Bluetooth module B also carries out the corresponding action until the Bluetooth module A uses the maximum power.

In step S508, after the powers of the communication parties are determined, two terminals start to carry out peer layer multiplexing information interaction and logical channel communication using the H.324 signaling, and the particular signaling flow is as shown in FIG. 5, first, the two parties exchange the terminal system capability thereof by way of a terminal capability set message, then a random number is exchanged by sending a maser slave determination message to determine the master and slave, then, the logical channel is opened using the open logical channel signaling, the multiplexing table can be sent after the logical channel is opened, and the actual data transmission can be started on the logical channel only after the multiplexing table is defined successfully. The PDU interacted between the Bluetooth modules is to encapsulate and de-encapsulate the above signaling. After the interaction of the H.324 signaling is completed, the internal visual communication can be started.

In step S510, the user A sends out an internal visual communication end command—End session. First, the logical communication channel of the higher layer is removed, then the Bluetooth wireless link is removed, which identifies that the internal visual communication is ended normally.

Embodiment 3

Figure 6:
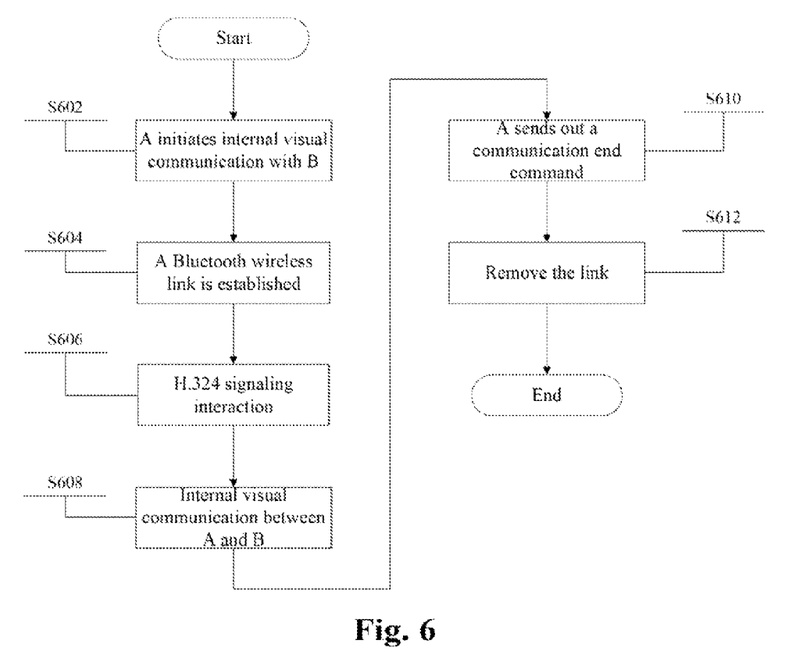
FIG. 6 is a flowchart of realizing internal visual communication based on Bluetooth according to embodiment 3.

FIG. 6 is a flowchart of realizing internal visual communication by way of Bluetooth according to embodiment 3, and this process includes:

in step S602, the user A initiates internal visual communication with the user B.

In step S604, the upper layer application sends a connection establish command to the Bluetooth module, and the Bluetooth wireless link is established successfully.

In step S606, the interaction of the H.324 signaling is carried out based on the successful establishment of the Bluetooth wireless link, so as to control and coordinate the H.223 and H.245 protocols and realize the call initiated by the upper layer application.

In step S608, the user A carries out internal visual communication with the user B.

In step S610, the user A (or user B) proposes to end the internal visual communication.

In step S612, the upper layer logical link is first removed, after it is completed, the Bluetooth wireless link is removed, and the communication is ended.

It can be seen from the above description that the solution provided by the above embodiments can realize the transmission of the video call PDU on the Bluetooth wireless communication link, so that the user who uses the Bluetooth mobile phone can directly carry out internal visual communication by way of Bluetooth.

Apparently, those skilled in the art shall understand that the above-mentioned modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the disclosure is not restricted to any particular hardware and software combination.

Above description is only to illustrate the preferred embodiments but not to limit the disclosure. Various alternations and changes to the disclosure are apparent to those skilled in the art. The scope defined in claims shall comprise any medication, equivalent substitution and improvement within the spirit and principle of the disclosure.

What is claimed is:

1. A method for realizing visual communication, comprising:

an initiating terminal and a receiving terminal of the visual communication establishing a Bluetooth wireless communication link between the initiating terminal and the receiving terminal via respective Bluetooth module thereof; and the initiating terminal and the receiving terminal transmitting multimedia information via the established Bluetooth wireless communication link to carry out the visual communication;

wherein before the initiating terminal and the receiving terminal transmitting the multimedia information via the established Bluetooth wireless communication link, the method further comprises: the initiating terminal and the receiving terminal transmitting control information to each other so as to indicate the opposite end to adjust a transceiving power of the Bluetooth module thereof to a preset target value; and the initiating terminal and the receiving terminal transmitting the multimedia information via the established Bluetooth wireless communication link comprises: the initiating terminal and the receiving terminal taking the preset target value indicated by the received control information as a current transceiving power of the Bluetooth module and transmitting the multimedia information via the established Bluetooth wireless communication link.

2. The method according to claim 1, wherein the initiating terminal and the receiving terminal transmitting the control information to each other so as to indicate the opposite end to adjust the transceiving power of the Bluetooth module thereof to the preset target value comprises:

the initiating terminal sending a first control information to the receiving terminal to indicate the receiving terminal to adjust the transceiving power of the Bluetooth module of the receiving terminal to the preset target value indicated by the first control information; and when adjusting the transceiving power of the Bluetooth module of the receiving terminal to the preset target value indicated by the first control information is completed, the receiving terminal sending a second control information to the initiating terminal to indicate the initiating terminal to adjust the transceiving power of the Bluetooth module of the initiating terminal to the preset target value indicated by the second control information.

3. The method according to claim 1, wherein the preset target value indicated by the control information is the maximum transceiving power of the Bluetooth module of the terminal which receives the control information.

4. The method according to claim 1, wherein the control information is sent by a link management protocol (LMP) entity of the Bluetooth module via an LMP protocol data unit (PDU).

5. The method according to claim 1, wherein the initiating terminal and the receiving terminal of the visual communication establishing the Bluetooth wireless communication link between the initiating terminal and the receiving terminal via the respective Bluetooth module thereof comprises:

a video call control (VCC) entity in the Bluetooth module of the initiating terminal receiving an instruction sent by an application of the initiating terminal for establishing the Bluetooth wireless communication link via an interface;

the VCC entity controlling a baseband layer to start up a process of query, paging, query scanning and paging scanning via the interface; and the VCC entity controlling the LMP entity to establish and issue the Bluetooth wireless communication link with the receiving terminal via the interface.

6. The method according to claim 5, wherein the initiating terminal and the receiving terminal transmitting the multimedia information via the established Bluetooth wireless communication link to carry out the visual communication comprises:

the VCC entity controlling a connection of an internal visual path by using a voice and video synchronization control interface, wherein the application is on the established Bluetooth wireless communication link, the application transmitting the multimedia information with an application of the receiving terminal via the internal visual path so as to carry out the visual communication.

7. The method according to claim 5, wherein before the initiating terminal and the receiving terminal transmitting the multimedia information via the established Bluetooth wireless communication link to carry out the visual communication, the method further comprises:

the VCC entity feeding back a message that the Bluetooth wireless communication link is established successfully to the application of the initiating terminal; and the application of the initiating terminal and the application of the receiving terminal carrying out an opposite layer multiplexing information interaction and a logical channel communication using an H.324 signaling.

8. The method according to claim 7, wherein after carrying out the visual communication, the method further comprises:

the initiating terminal or the receiving terminal initiating a visual communication end command to the opposite end;

removing the logical channel between the initiating terminal and the receiving terminal; and removing the Bluetooth wireless communication link between the initiating terminal and the receiving terminal.

9. The method according to claim 1, wherein the Bluetooth wireless communication link is a synchronous connection-oriented (SCO) link.

10. The method according to claim 2, wherein the preset target value indicated by the control information is the maximum transceiving power of the Bluetooth module of the terminal which receives the control information.

11. The method according to claim 2, wherein the control information is sent by a link management protocol (LMP) entity of the Bluetooth module via an LMP protocol data unit (PDU).

12. The method according to claim 2, wherein the Bluetooth wireless communication link is a synchronous connection-oriented (SCO) link.

13. The method according to claim 5, wherein the Bluetooth wireless communication link is a synchronous connection-oriented (SCO) link.

14. The method according to claim 6, wherein the Bluetooth wireless communication link is a synchronous connection-oriented (SCO) link.

15. The method according to claim 7, wherein the Bluetooth wireless communication link is a synchronous connection-oriented (SCO) link.

16. The method according to claim 8, wherein the Bluetooth wireless communication link is a synchronous connection-oriented (SCO) link.

17. A terminal, comprising:

a Bluetooth module, configured to interact with a Bluetooth module of an opposite end and establish a Bluetooth wireless communication link between the terminal and the opposite end; and a visual communication module, configured to transmit multimedia information via the established Bluetooth wireless communication link with the opposite end to carry out visual communication;

wherein, the terminal further comprises: a control transceiving module, configured to send to the opposite end a first control information indicating to adjust a transceiving power of the Bluetooth module of the opposite end to a preset target value, and receive from the terminal a second control information indicating to adjust a transceiving power of the Bluetooth module of the terminal to the preset target value; and the visual communication module, configured to take the preset target value indicated by the second control information as a current transceiving power of the Bluetooth module of the terminal, and transmit the multimedia information via the established Bluetooth wireless communication link to carry out the visual communication.

* * * * *